US012715038B2

(12) United States Patent
Kim et al.

(10) Patent No.: US 12,715,038 B2
(45) Date of Patent: Aug. 25, 2026

(54) METHOD FOR PRODUCING FILM

(71) Applicant: LG CHEM, LTD., Seoul (KR)

(72) Inventors: So Jin Kim, Daejeon (KR); Jong Min Shin, Daejeon (KR); Dong Woo Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 559 days.

(21) Appl. No.: 16/648,833

(22) PCT Filed: Sep. 21, 2018

(86) PCT No.: PCT/KR2018/011303
§ 371 (c)(1),
(2) Date: Mar. 19, 2020

(87) PCT Pub. No.: WO2019/059731
PCT Pub. Date: Mar. 28, 2019

(65) Prior Publication Data

US 2020/0246873 A1 Aug. 6, 2020

(30) Foreign Application Priority Data

Sep. 22, 2017 (KR) ........................ 10-2017-0122575

(51) Int. Cl.
*B22F 7/00* (2006.01)
*B22F 3/11* (2006.01)
*B22F 7/04* (2006.01)

(52) U.S. Cl.
CPC ................ *B22F 7/002* (2013.01); *B22F 3/11* (2013.01); *B22F 7/004* (2013.01); *B05D 2202/00* (2013.01); *B22F 2003/1106* (2013.01); *B22F 2007/047* (2013.01); *B22F 2301/052* (2013.01); *B22F 2301/058* (2013.01); *B22F 2301/10* (2013.01); *B22F 2301/15* (2013.01); *B22F 2301/25* (2013.01); *B22F 2301/35* (2013.01)

(58) Field of Classification Search
None
See application file for complete search history.

(56) References Cited

U.S. PATENT DOCUMENTS 5,848,351 A * 12/1998 Hoshino ............... B22F 3/1125
428/553
10,544,994 B2 1/2020 Wakaoka et al.
2006/0233692 A1 10/2006 Scaringe et al.
(Continued)

FOREIGN PATENT DOCUMENTS

CN 1686599 A * 10/2005
CN 101298675 A 11/2008
(Continued)

OTHER PUBLICATIONS

JP H09-119789 translation (Year: 1997).*
(Continued)

*Primary Examiner* — Stephani Hill
(74) *Attorney, Agent, or Firm* — SALIWANCHIK, LLOYD & EISENSCHENK

(57) ABSTRACT

The present application provides a method for producing a film. In the present application, for example, a method for producing a film which can be applied to production of a heat-dissipating material such as a heat pipe can be provided.

13 Claims, 2 Drawing Sheets

(56) References Cited

U.S. PATENT DOCUMENTS

| | | | | |
|---|---|---|---|---|
| 2009/0232692 | A1* | 9/2009 | Wada | B22F 3/1021 419/2 |
| 2010/0294475 | A1* | 11/2010 | Rush | H01L 23/427 165/185 |
| 2015/0017511 | A1 | 1/2015 | Schmitz et al. | |
| 2017/0108148 | A1* | 4/2017 | Lu | C09D 1/00 |
| 2017/0333992 | A1* | 11/2017 | Gao | B22F 3/1021 |

FOREIGN PATENT DOCUMENTS

| | | | | |
|---|---|---|---|---|
| CN | 103528410 | A | | 1/2014 |
| CN | 104588651 | A | | 5/2015 |
| CN | 105705901 | A | | 6/2016 |
| EP | 3437767 | A1 | | 2/2019 |
| EP | 3549700 | A1 | | 10/2019 |
| JP | H09119789 | A | | 5/1997 |
| JP | H09133485 | | | 5/1997 |
| JP | 09155124 | A | * | 6/1997 |
| JP | 2004153087 | A | * | 5/2004 |
| JP | 2005290493 | | | 10/2005 |
| JP | 2008286454 | A | | 11/2008 |
| JP | 2010123297 | A | * | 6/2010 |
| JP | 2013084551 | A | * | 5/2013 |
| JP | 2013145835 | | | 7/2013 |
| JP | 2017028018 | | | 2/2017 |
| JP | 2018160602 | A | * | 10/2018 |
| KR | 20020074851 | | * | 10/2002 |
| KR | 1020140116074 | | | 10/2014 |
| KR | 1020160146614 | | | 12/2016 |
| WO | 2016/151916 | | | 9/2016 |
| WO | 2016141916 | A1 | | 9/2016 |

OTHER PUBLICATIONS

JP H09-155124 machine translation (Year: 1997).*

CN 1686599 machine translation (Year: 2005).*

JP 2010-123297 machine translation (Year: 2010).*

Gale et al, ed. 14 General physical properties. Smithells Metal Reference Book. Elsevier. 2004. pp. 14-1 to 14-45. (Year: 2004).*

International Search Report corresponding to PCT/KR2018/011303, mailed Jan. 29, 2019 (5 pp, including English translation).

D.K. Khrustalev et al. "Heat pipe with combined capillary-porous structure" Journal of Engineering Physics 52:424-427 (1987) (Abstract only).

Ji Xianbing et al. "Investigation on Heat Transfer Performance of Flat Heat Pipes With Ultra-light Porous Metal Foam Wicks" Chin. Soc. for Elec. Eng. 33(2):72-78 (Jan. 2013) (English Abstract included).

Extended European Search Report corresponding to EP 18858501.2; dated Sep. 3, 2020 (8 pages).

* cited by examiner

METHOD FOR PRODUCING FILM

CROSS REFERENCE TO RELATED APPLICATIONS

This application is a 35 U.S.C. § 371 national stage application of PCT International Application No. PCT/KR2018/011303, filed Sep. 21, 2018, which claims priority from Korean Patent Application No. 10-2017-0122575, filed Sep. 22, 2017, the contents of which are incorporated herein in their entireties by reference. The above-referenced PCT International Application was published in the Korean language as International Publication No. WO 2019/059731 on Mar. 28, 2019.

TECHNICAL FIELD

The present application relates to a method for producing a film.

BACKGROUND ART

Heat-dissipating materials can be used in various applications. For example, since batteries and various electronic apparatuses generate heat during operation, a material capable of effectively controlling such heat is required.

As a typical heat-dissipating material, a film in which a ceramic material having high thermal conductivity or the like is dispersed in a polymer matrix is known. However, these films are generally unsatisfactory in thermal conductivity.

As another heat-dissipating material, a so-called heat pipe is also known. This material is also inexpensive while exhibiting excellent heat dissipation efficiency, and thus has been widely used, recently.

However, the heat pipe is mostly thick, whereby the applied uses are limited.

DISCLOSURE

Technical Problem

It is an object of the present application to provide a method for producing a film, for example, a film which can be used for a heat-dissipating material such as a heat pipe.

Technical Solution

The production method of the present application comprises a step of directly coating a slurry containing thermally conductive metal particles on a metal substrate and sintering it to form a porous metal layer. In this way, the porous metal layer can have high porosity and a small pore size while having a thin thickness, and also have excellent adhesiveness with the metal substrate.

In the present application, the term porous metal layer means a porous structure comprising a metal as a main component. Here, the metal as a main component means that the ratio of the metal is 55 weight % or more, 60 weight % or more, 65 weight % or more, 70 weight % or more, 75 weight % or more, 80 weight % or more, 85 weight % or more, 90 weight % or more, or 95 weight % or more based on the total weight of the metal layer. The upper limit of the ratio of the metal contained as the main component is not particularly limited, and for example, may be 100 weight %.

The term porous property may mean a case where porosity is 30% or more, 40% or more, 50% or more, 60% or more, 70% or more, 75% or more, or 80% or more. The upper limit of the porosity is not particularly limited, and may be, for example, less than about 100%, about 99% or less, or about 98% or less, about 95% or less, or about 90% or less or so. Here, the porosity can be calculated in a known manner by calculating the density of the metal layer.

In the production method of the present application, the slurry basically comprises thermally conductive metal particles.

In one example, the metal particles may have thermal conductivity of about 8 W/mK or more, about 10 W/mK or more, about 15 W/mK or more, about 20 W/mK or more, about 25 W/mK or more, about 30 W/mK or more, about 35 W/mK or more, about 40 W/mK or more, about 45 W/mK or more, about 50 W/mK or more, about 55 W/mK or more, about 60 W/mK or more, about 65 W/mK or more, about 70 W/mK or more, about 75 W/mK or more, about 80 W/mK or more, about 85 W/mK or more, or about 90 W/mK or more. The higher the thermal conductivity of the metal particles, the film having more excellent heat dissipation efficiency can be obtained, and thus the upper limit is not particularly limited, which may be, for example, about 1,000 W/mK or less or so.

Among physical properties mentioned in this specification, when the measured temperature affects relevant physical properties, the physical properties are physical properties measured at room temperature, unless otherwise specified. The term room temperature is a natural temperature without being heated or cooled, which may be, for example, any temperature in a range of 10° C. to 30° C., or a temperature of about 23° C. or about 25° C. or so.

The specific kind of the metal particles is not particularly limited as long as they have the above-mentioned thermal conductivity, and for example, may be any one selected from the group consisting of copper, gold, silver, aluminum, silver, nickel, iron, cobalt, magnesium, molybdenum, tungsten, platinum, magnesium and zinc, or an alloy of two or more of the foregoing, but is not limited thereto.

The shape of the metal particles may be appropriately selected in consideration of porosity, pore size or pore shape of the desired porous metal layer. For example, the metal particles may have various shapes such as a substantially spherical shape, a needle shape, a plate shape, a dendrite shape, or a star shape.

In one example, the average particle diameter of the metal particles may be in a range of about 100 nm to 200 μm. Within the above range, the average particle diameter can be suitably selected in consideration of porosity, pore size or pore shape of the desired porous metal layer, and the like.

In one example, the slurry may comprise at least a metal having appropriate relative magnetic permeability and conductivity. If an induction heating method is applied when the slurry is sintered according to one example of the present application, the application of such a metal can smoothly perform the sintering according to the relevant method.

For example, as the metal, a metal having relative magnetic permeability of 90 or more may be used. Here, the relative magnetic permeability ($\mu_r$) is a ratio ($\mu/\mu_0$) of the magnetic permeability ($\mu$) of the relevant material to the magnetic permeability ($\mu_0$) in the vacuum. The metal used in the present application may have relative magnetic permeability of 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. As the relative magnetic permeability has a higher value, it generates higher heat at the time of applying an electromagnetic field for induction heating to be described below, and thus the upper limit is not particularly limited. In one example, the upper limit of the relative magnetic permeability may be, for example, about 300,000 or less.

The metal may be a metal or an alloy thereof having conductivity at 20° C. of about 8 MS/m or more, 9 MS/m or more, 10 MS/m or more, 11 MS/m or more, 12 MS/m or more, 13 MS/m or more, or 14.5 MS/m or more. The upper limit of the conductivity is not particularly limited, and may be, for example, about 30 MS/m or less, 25 MS/m or less, or 20 MS/m or less.

In the present application, the metal having the relative magnetic permeability and conductivity may also be simply referred to as a conductive magnetic metal.

By applying the conductive magnetic metal, sintering can be more effectively performed when an induction heating process to be described below is performed. Such a metal can be exemplified by nickel, iron or cobalt, and the like, but is not limited thereto.

The slurry may further comprise a binder. The kind of the applicable binder is not particularly limited, which may be appropriately selected depending on the kind of the metal particles or a dispersant, and the like applied at the time of producing the slurry. The binder may be exemplified by alkyl cellulose or alkyl cellulose ammonium having an alkyl group with 1 to 20 carbon atoms, 1 to 16 carbon atoms, 1 to 12 carbon atoms or 1 to 8 carbon atoms such as methyl cellulose, ethyl cellulose, hydroxypropylmethyl cellulose, hydroxyethyl cellulose or carboxymethyl cellulose ammonium, polyalkylene carbonate, polyalkylene carbonate having an alkylene unit with 1 to 8 carbon atoms such as polypropylene carbonate or polyethylene carbonate, or a polyvinyl alcohol-based binder such as polyvinyl alcohol or polyvinyl acetate, and the like, but is not limited thereto.

The ratio of each component in the slurry is not particularly limited. This ratio can be adjusted in consideration of process efficiency such as a coating property and moldability upon the process using the slurry.

For example, in the slurry, the binder may be included in a ratio of about 5 to 200 parts by weight relative to 100 parts by weight of the above-described metal particles. In another example, the ratio may be about 10 parts by weight or more, about 15 parts by weight or more, about 20 parts by weight or more, or about 25 parts by weight or more, or may be about 190 parts by weight or less, 180 parts by weight or less, 170 parts by weight or less, 160 parts by weight or less, 150 parts by weight or less, 140 parts by weight or less, 130 parts by weight or less, 120 parts by weight or less, 110 parts by weight or less, 100 parts by weight or less, 90 parts by weight or less, 80 parts by weight or less, 70 parts by weight or less, 60 parts by weight or less, 50 parts by weight or less, or 40 parts by weight or less.

In this specification, the unit part by weight means a weight ratio between the respective components, unless otherwise specified.

The slurry may further comprise a dispersant. Here, as the dispersant, for example, an alcohol may be applied. As the alcohol, a monohydric alcohol having 1 to 20 carbon atoms such as methanol, ethanol, propanol, pentanol, octanol, pentanol, 2-methoxyethanol, 2-ethoxyethanol, 2-butoxyethanol, glycerol, texanol, or terpineol, or a dihydric alcohol having 1 to 20 carbon atoms such as ethylene glycol, propylene glycol, hexane diol, octane diol or pentane diol, or a polyhydric alcohol, etc., may be used, but the kind is not limited to the above.

In the slurry, the dispersant may be contained in a ratio of about 10 to 500 parts by weight relative to 100 parts by weight of the metal particles. In another example, the ratio may be about 20 parts by weight or more, 30 parts by weight or more, 40 parts by weight or more, 50 parts by weight or more, 60 parts by weight or more, 70 parts by weight or more, 80 parts by weight or more, 90 parts by weight or more, 100 parts by weight or more, 110 parts by weight or more, 120 parts by weight or more, 130 parts by weight or more, 140 parts by weight or more, 150 parts by weight or more, or 160 parts by weight or more, and may be about 490 parts by weight or less, 480 parts by weight or less, 470 parts by weight or less, 460 parts by weight or less, 450 parts by weight or less, 440 parts by weight or less, 430 parts by weight or less, 420 parts by weight or less, 410 parts by weight or less, 400 parts by weight or less, 390 parts by weight or less, 380 parts by weight or less, 370 parts by weight or less, 360 parts by weight or less, 350 parts by weight or less, 340 parts by weight or less, 330 parts by weight or less, 320 parts by weight or less, 310 parts by weight or less, 300 parts by weight or less, 290 parts by weight or less, 280 parts by weight or less, 270 parts by weight or less, 260 parts by weight or less, 250 parts by weight or less, 240 parts by weight or less, 230 parts by weight or less, 220 parts by weight or less, 210 parts by weight or less, 200 parts by weight or less, 190 parts by weight or less, or 180 parts by weight or less or so.

The slurry may, if necessary, further comprise a solvent. As the solvent, an appropriate solvent may be used in consideration of solubility of the slurry component, for example, the metal particles or the binder, and the like. For example, as the solvent, those having a dielectric constant within a range of about 10 to 120 can be used. In another example, the dielectric constant may be about 20 or more, about 30 or more, about 40 or more, about 50 or more, about 60 or more, or about 70 or more, or may be about 110 or less, about 100 or less, or about 90 or less. Such a solvent may be exemplified by water, an alcohol having 1 to 8 carbon atoms such as ethanol, butanol or methanol, DMSO (dimethyl sulfoxide), DMF (dimethyl formamide) or NMP (N-methylpyrrolidinone), and the like, but is not limited thereto.

When a solvent is applied, it may be present in the slurry at a ratio of about 50 to 400 parts by weight relative to 100 parts by weight of the binder, but is not limited thereto.

The slurry may also comprise, in addition to the above-mentioned components, known additives which are additionally required.

The present application comprises a step of pattern-printing such a slurry on the metal substrate. Here, the pattern-printing means that the slurry is formed on the metal substrate in a predetermined pattern. At this time, the shape of the pattern to be applied is not particularly limited, which may be selected in consideration of the applied uses of the film and the like. For example, the film can be applied to the manufacture of heat pipes, and in this case, the porous metal layer can act as a so-called wick of a heat pipe. In the heat pipe, the wick may serve as a passage through which a fluid or the like moves, and the pattern may be determined such that the flow of the fluid can be smoothly performed. Various patterns that the flow of the fluid can be smoothly performed are known in the related industry, and in the present application, all of these contents can be applied.

The method of pattern-printing a slurry on a substrate is not particularly limited, which can be performed by using suitable printing means, for example, various dispensers or the like.

A thermally conductive substrate may also be used as the metal substrate. In one example, the substrate may have thermal conductivity of about 8 W/mK or more, about 10 W/mK or more, about 15 W/mK or more, about 20 W/mK or more, about 25 W/mK or more, about 30 W/mK or more, about 35 W/mK or more, about 40 W/mK or more, about 45 W/mK or more, about 50 W/mK or more, about 55 W/mK or more, about 60 W/mK or more, about 65 W/mK or more, about 70 W/mK or more, about 75 W/mK or more, about 80 W/mK or more, about 85 W/mK or more, or about 90 W/mK or more. As the metal substrate has higher thermal conductivity, the film having more excellent heat dissipation efficiency may be obtained, and thus the upper limit is not particularly limited, which may be, for example, about 1,000 W/mK or less or so.

The specific type of the metal substrate is not particularly limited as long as it has the above-mentioned thermal conductivity, which may be, for example, a substrate of any one selected from the group consisting of SUS (stainless steel), copper, gold, silver, aluminum, silver, nickel, iron, cobalt, magnesium, molybdenum, tungsten, platinum, magnesium and zinc, or an alloy of two or more thereof, but is not limited thereto.

In one example, the metal substrate may be the same material as the thermally conductive particles in the slurry, or may be a substrate of different material.

In the present application, a porous metal layer is formed through a process of pattern-printing a slurry on a metal substrate as above, and then sintering the printed slurry. FIG. 1 schematically shows a process of pattern-printing a slurry (200) on a metal substrate (100) and sintering it to form a metal layer (300).

If necessary, a step of drying the printed slurry under appropriate conditions may also be performed between the printing and sintering processes. When the drying process is performed, the conditions are not particularly limited, and for example, it may be performed at a temperature in a range of about 20° C. to 150° C. or so for about 20 minutes to 5 hours or so, but is not limited thereto.

Here, the method of performing sintering is not particularly limited, and a known sintering method in which appropriate heat is applied in consideration of the material composition or shape of the printed slurry can be applied. At this time, the sintering temperature and the sintering time to be applied are not particularly limited, which may be set in consideration of the material composition or shape of the slurry.

As a method different from the existing known method, in the present application, the sintering can be performed by an induction heating method. That is, as described above, when the slurry includes the conductive magnetic metal, the induction heating method can be applied. By such a method, it is possible to smoothly manufacture the metal layer having excellent mechanical properties and whose porosity is controlled to the desired level as well as comprising uniformly formed pores.

Here, the induction heating is a phenomenon in which heat is generated from a specific metal when an electromagnetic field is applied. For example, if an electromagnetic field is applied to a metal having a proper conductivity and magnetic permeability, eddy currents are generated in the metal, and Joule heating occurs due to the resistance of the metal. In the present application, a sintering process through such a phenomenon can be performed. In the present application, the sintering of the metal foam can be performed in a short time by applying such a method, thereby ensuring the processability, and simultaneously a metal foam having a small pore size and excellent adhesiveness with the metal substrate while being in the form of a thin film having high porosity can be produced.

Thus, the sintering process may comprise a step of applying heat or electromagnetic fields to the pattern-printed slurry. Here, the application of heat may be performed by treating the pattern-printed slurry at a temperature in a range of about 300° C. to 2,000° C. for a time in a range of 30 minutes to 10 hours using an appropriate means such as an oven.

Also, the Joule heating occurs due to induction heating phenomenon in the conductive magnetic metal by the application of the electromagnetic field, whereby the structure can be sintered. At this time, the conditions for applying the electromagnetic field are not particularly limited as they are determined depending on the kind and ratio of the conductive magnetic metal in the slurry. For example, the induction heating can be performed using an induction heater formed in the form of a coil or the like. In addition, the induction heating can be performed, for example, by applying a current of 100 A to 1,000 A or so. In another example, the applied current may have a magnitude of 900 A or less, 800 A or less, 700 A or less, 600 A or less, 500 A or less, or 400 A or less. In another example, the current may have a magnitude of about 150 A or more, about 200 A or more, or about 250 A or more.

The induction heating can be performed, for example, at a frequency of about 100 kHz to 1,000 kHz. In another example, the frequency may be 900 kHz or less, 800 kHz or less, 700 kHz or less, 600 kHz or less, 500 kHz or less, or 450 kHz or less. In another example, the frequency may be about 150 kHz or more, about 200 kHz or more, or about 250 kHz or more.

The application of the electromagnetic field for the induction heating can be performed within a range of, for example, about 1 minute to 10 hours. In another example, the application time may be about 10 minutes or more, about 20 minutes or more, or about 30 minutes or more. In another example, the application time may be about 9 hours or less, about 8 hours or less, about 7 hours or less, about 6 hours or less, about 5 hours or less, about 4 hours or less, about 3 hours or less, about 2 hours or less, about 1 hour or less, or about 30 minutes or less.

The above-mentioned induction heating conditions, for example, the applied current, the frequency and the application time, and the like may be changed in consideration of the kind and the ratio of the conductive magnetic metal, as described above.

The sintering may be performed by any one means of the application of heat or electromagnetic fields, or may also be performed by a method of simultaneously applying both, that is, a method of applying appropriate heat together with the application of an electromagnetic field.

The porous metal layer produced according to such a method of the present application may have high porosity and a small pore size while having a thin thickness, and may also have excellent adhesiveness with a metal substrate.

In one example, the metal layer may have an average pore size of 100 μm or less while being porous. Such a pore size can be confirmed by, for example, a method of an SEM (scanning electron microscope) image analysis or the like.

The lower limit of the pore size is not particularly limited, which may be, for example, about 1 nm to 1 μm or so.

In one example, the metal layer may have porosity of about 30% or more. Here, the porosity can be calculated in a known manner by calculating the density of the metal layer. In another example, the porosity may be 35% or more, 40% or more, 45% or more, 50% or more, 55% or more, 60% or more, or 65% or more, or may be 99% or less, 95% or less, 90% or less, 85% or less, 80% or less, or 75% or less or so.

In one example, the metal layer may have a thickness of about 500 μm or less. In another example, the thickness may be about 450 μm or less, 400 μm or less, 350 μm or less, 300 μm or less, 250 μm or less, 200 μm or less, or 150 μm or less. The lower limit of the thickness is not particularly limited, which may be, for example, about 1 μm or more, 5 μm or more, or 10 μm or more or so.

The film of the present application produced in such a manner may be applied to various applications, one example of which is application to the manufacture of heat pipes. In this case, a process of attaching two films produced in such a manner to each other is necessary, where this process is described, for example, in FIG. 2. FIG. 2 schematically shows a process of attaching two films, wherein in each film, a metal layer (300) is formed on a metal substrate (100), to each other.

That is, the present application may also comprise a step of bonding the edges of the metal substrates of two films produced by the above method in a state where the films are positioned so that the porous metal layers formed on the respective films face each other.

Here, the method of bonding the edges of the metal substrates is not particularly limited, and a known metal attaching method such as welding can be applied.

Advantageous Effects

In the present application, for example, a method for producing a film which can be applied to production of a heat-dissipating material such as a heat pipe can be provided.

MODE FOR INVENTION

Hereinafter, the present application will be specifically described by way of examples, but the scope of the present application is not limited to the following examples.

Example 1

Preparation of Slurry

A slurry was prepared by blending copper particle powder (thermal conductivity: 401 W/mK, form: dendrite type, average length: about 40 μm) with a binder (polyvinylacetate) and a dispersant (terpinol). Here, the weight of the copper particle powder is about 10 g, the weight of the polyvinylacetate is about 3 g, and the weight of the dispersant (terpinol) is about 17 g.

Production of Film

Figure 1:
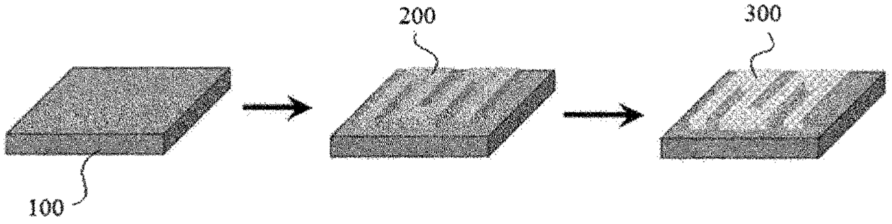
FIGS. 1 and 2 are diagrams schematically showing processes disclosed in the present application.
Figure 2:
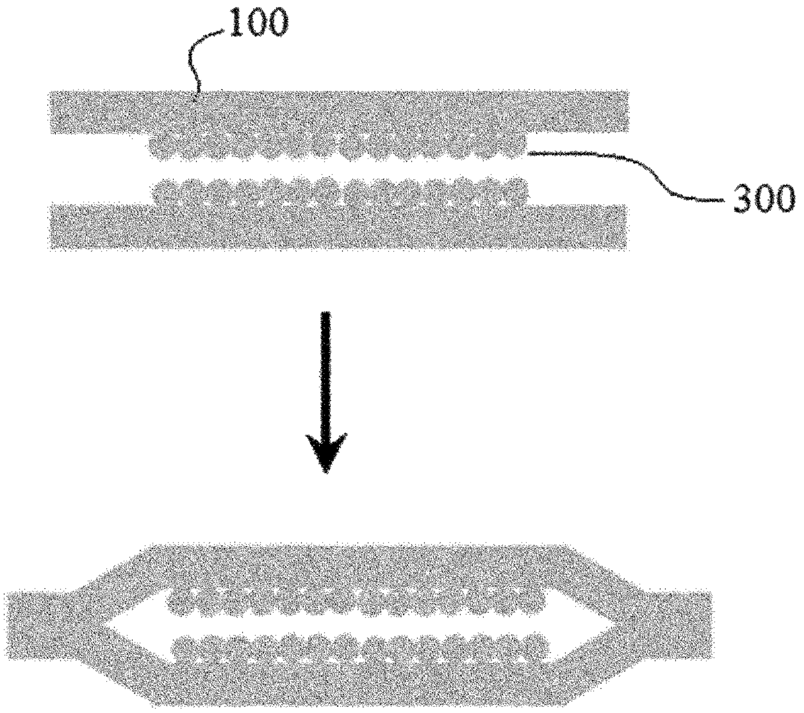
Figure 3:
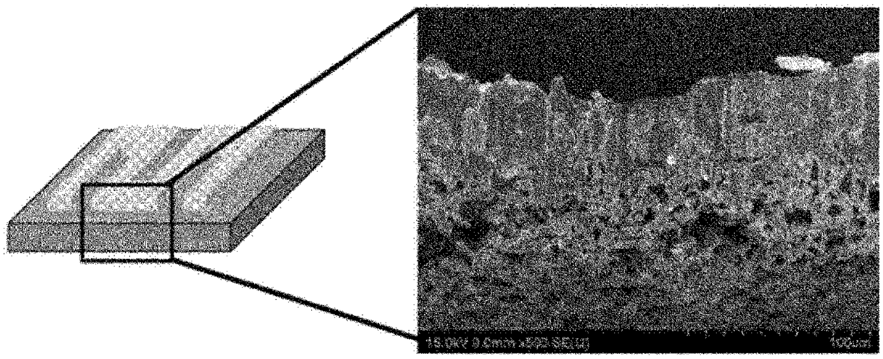
FIGS. 3 and 4 are photographs showing the shapes of the films produced in Examples.
Figure 4:
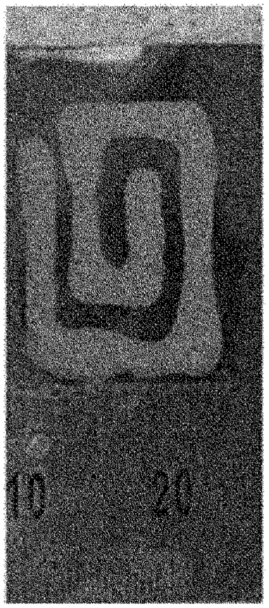

The prepared slurry was pattern-printed on a copper foil as a substrate. The pattern-printed form is as shown in FIGS. 3 and 4. Subsequently, it was dried at a temperature of about 120° C. for about 1 hour to form a green film. Thereafter, a porous copper layer was formed by heat-treating the green film at a temperature of about 1000° C. for about 2 hours in a hydrogen/argon gas atmosphere to remove organic components. The thickness of the formed copper layer was about 21.5 μm, and the porosity was about 70% or so.

What is claimed is:

1. A method for producing a film, the method comprising:

pattern-coating a slurry on a metal substrate, wherein the metal substrate has a thermal conductivity of about 8 Watts per meter per Kelvin (W/mK) or more;

drying the pattern-coated slurry before sintering the pattern-coated slurry, wherein drying the pattern-coated slurry is performed at a temperature in a range of from 120° C. to 150° C.; and sintering the pattern-coated slurry to form a porous metal layer on the metal substrate to thereby produce the film that includes the metal substrate and the porous metal layer, wherein the slurry comprises thermally conductive metal particles, a binder, and an alcohol, wherein the metal substrate is the same material as the thermally conductive metal particles in the slurry, wherein sintering the pattern-coated slurry is performed at a temperature in a range of from 300° C. to 1100° C. in an atmosphere including hydrogen and argon, wherein the alcohol is texanol and/or terpineol, wherein the slurry comprises the alcohol in an amount of 160 to 500 parts by weight relative to 100 parts by weight of the thermally conductive metal particles, wherein the porous metal layer has a porosity of 70% or more, and wherein the porous metal layer has a thickness of 150 μm or less.

2. The method for producing the film according to claim 1, wherein the thermally conductive metal particles are any one selected from the group consisting of iron particles, cobalt particles, copper particles, gold particles, aluminum particles, silver particles, nickel particles, molybdenum particles, platinum particles, and magnesium particles.

3. The method for producing the film according to claim 1, wherein an average particle diameter of the thermally conductive metal particles is in a range of from 100 nm to 200 μm.

4. The method for producing the film according to claim 1, wherein the binder is selected from the group consisting of alkyl cellulose, polyalkylene carbonate, polyvinyl alcohol, and polyvinyl acetate.

5. The method for producing the film according to claim 1, wherein the binder is contained in the slurry in a ratio of from about 25 to about 200 parts by weight relative to 100 parts by weight of the thermally conductive metal particles.

6. The method for producing the film according to claim 1, wherein the porous metal layer comprises pores having an average pore size of at most 100 μm.

7. The method for producing the film according to claim 1, wherein the metal substrate is an iron substrate, a copper substrate, a gold substrate, an aluminum substrate, a silver substrate, a nickel substrate, a molybdenum substrate, a platinum substrate, or a magnesium substrate.

8. The method for producing the film according to claim 1, wherein drying the pattern-coated slurry is performed for from about 20 minutes to about 5 hours.

9. The method for producing the film according to claim 1, wherein sintering the pattern-coated slurry is performed for from about 30 minutes to about 10 hours.

10. The method for producing the film according to claim 1, wherein the metal substrate is a copper substrate, and the thermally conductive metal particles are copper particles.

11. The method for producing the film according to claim 10, wherein the porous metal layer has adhesiveness with the metal substrate.

12. The method for producing the film according to claim 1, wherein the porous metal layer has adhesiveness with the metal substrate.

13. A method for manufacturing a heat pipe, the method comprising:

providing a first film including a first metal substrate and a first porous metal layer formed on the first metal substrate and a second film including a second metal substrate and a second porous metal layer formed on the second metal substrate; and bonding edge portions of the first and second metal substrates, wherein the first and second porous metal layers are produced by the method of claim 1, and the first and second porous metal layers face each other after the bonding.

* * * * *